US009087519B2

(12) United States Patent
Zechner et al.

(10) Patent No.: US 9,087,519 B2
(45) Date of Patent: Jul. 21, 2015

(54) COMPUTER-IMPLEMENTED SYSTEMS AND METHODS FOR EVALUATING PROSODIC FEATURES OF SPEECH

(75) Inventors: Klaus Zechner, Princeton, NJ (US); Xiaoming Xi, Pennington, NJ (US)

(73) Assignee: Educational Testing Service, Princeton, NJ (US)

( * ) Notice: Subject to any disclaimer, the term of this patent is extended or adjusted under 35 U.S.C. 154(b) by 235 days.

(21) Appl. No.: 13/424,643

(22) Filed: Mar. 20, 2012

(65) Prior Publication Data

US 2012/0245942 A1 Sep. 27, 2012

Related U.S. Application Data

(60) Provisional application No. 61/467,498, filed on Mar. 25, 2011.

(51) Int. Cl.

*G10L 15/00* (2013.01)
*G10L 25/03* (2013.01)
*G10L 25/90* (2013.01)
*G10L 13/10* (2013.01)

(52) U.S. Cl.

CPC ................. *G10L 25/03* (2013.01); *G10L 25/90* (2013.01); *G10L 13/10* (2013.01)

(58) Field of Classification Search

CPC .......... G10L 21/00; G10L 13/08; G06F 17/30
USPC ......... 704/254, 200, 235, 240, 241, 243, 250, 704/256.7, 228, 260, 267; 707/728
See application file for complete search history.

(56) References Cited

U.S. PATENT DOCUMENTS

| | | | | |
|---|---|---|---|---|
| 4,912,768 | A * | 3/1990 | Benbassat | 704/260 |
| 5,230,037 | A * | 7/1993 | Giustiniani et al. | 704/200 |
| 5,640,490 | A * | 6/1997 | Hansen et al. | 704/254 |
| 6,081,780 | A * | 6/2000 | Lumelsky | 704/260 |
| 6,185,533 | B1 * | 2/2001 | Holm et al. | 704/267 |
| 7,069,216 | B2 * | 6/2006 | DeMoortel et al. | 704/260 |
| 7,219,060 | B2 * | 5/2007 | Coorman et al. | 704/258 |
| 8,676,574 | B2 * | 3/2014 | Kalinli | 704/207 |

(Continued)

OTHER PUBLICATIONS

Alwan, Abeer, Bai, Yijian, Black, Matt, Casey, Larry, Gerosa, Matteo, Heritage, Margaret, Iseli, Markus, Jones, Barbara, Kazemzadeh, Abe, Lee, Sungbok, Narayanan, Shrikanth, Price, Patti, Tepperman, Joseph, Wang, Shizhen; A System for Technology Based Assessment of Language and Literacy in Young Children: the Role of Multiple Information Sources; Proc. of IEEE Int'l Workshop on Multimedia Signal Processing; Greece; 2007.

(Continued)

*Primary Examiner* — Michael Colucci
(74) *Attorney, Agent, or Firm* — Jones Day

(57) ABSTRACT

Systems and methods are provided for scoring speech. A speech sample is received, where the speech sample is associated with a script. The speech sample is aligned with the script. An event recognition metric of the speech sample is extracted, and locations of prosodic events are detected in the speech sample based on the event recognition metric. The locations of the detected prosodic events are compared with locations of model prosodic events, where the locations of model prosodic events identify expected locations of prosodic events of a fluent, native speaker speaking the script. A prosodic event metric is calculated based on the comparison, and the speech sample is scored using a scoring model based upon the prosodic event metric.

35 Claims, 9 Drawing Sheets

(56) References Cited

U.S. PATENT DOCUMENTS

| | | | | |
|---|---|---|---|---|
| 2003/0212555 | A1* | 11/2003 | van Santen | 704/241 |
| 2004/0006461 | A1* | 1/2004 | Gupta et al. | 704/200 |
| 2004/0111263 | A1* | 6/2004 | Nishitani et al. | 704/256 |
| 2006/0074655 | A1* | 4/2006 | Bejar et al. | 704/243 |
| 2006/0178882 | A1* | 8/2006 | Braho et al. | 704/240 |
| 2008/0082333 | A1* | 4/2008 | Nurminen et al. | 704/250 |
| 2008/0300874 | A1* | 12/2008 | Gavalda et al. | 704/235 |
| 2009/0048843 | A1* | 2/2009 | Nitisaroj et al. | 704/260 |
| 2010/0121638 | A1* | 5/2010 | Pinson et al. | 704/235 |
| 2012/0203776 | A1* | 8/2012 | Nissan | 707/728 |

OTHER PUBLICATIONS

Beckman, Mary, Hirschberg, Julia, Shattuck-Hufnagel, Stefanie; The Original ToBI System and the Evolution of the ToBI Framework; In Prosodic Typology—The Phonology of Intonation and Phrasing, S.A. Jun (Ed.); Oxford University Press: Oxford, UK; 2005.

Chen, Lei, Zechner, Klaus, Xi, Xiaoming; Improved Pronunciation Features for Construct-Driven Assessment of Non-Native Spontaneous Speech; Proceedings of the NAACL-HLT-2009 Conference; Boulder, CO; pp. 442-449; 2009.

Cucchiarini, Catia, Strik, Helmer, Boves, Lou; Quantitative Assessment of Second Language Learners' Fluency: Comparisons Between Read and Spontaneous Speech; Journal of the Acoustical Society of America, 111(6); pp. 2862-2873; 2002.

Dong, Honghui, Tao, Jianhua, Xu, Bo; Chinese prosodic Phrasing with a Constraint-Based Approach; INTERSPEECH 2005; pp. 3241-3244; 2005.

Franco, Horacio, Bratt, Harry, Rossier, Romain, Gade, Venkata Rao, Shriberg, Elizabeth, Abrash, Victor, Precoda, Kristin; EduSpeak: A Speech Recognition and Pronunciation Scoring Toolkit for Computer-Aided Language Learning Applications; Language Testing, 27(3); pp. 401-418; 2010.

Linguistic Data Consortium; HUB-4 Broadcast News Corpus (English); 1997.

Liscombe, Jackson; Prosody and Speaker State: Paralinguistics, Pragmatics, and Proficiency; Ph.D. Thesis, Columbia University, New York, NY; 2007.

Mostow, Jack, Roth, Steven, Hauptmann, Alexander, Kane, Matthew; A Prototype Reading Coach That Listens; Proceedings of the 12th National Conference on Artificial Intelligence (AAAI); 1994.

NIST; The Rich Transcription Fall 2003 Evaluation Plan; http://www.itl.nist.gov/iad/mig/tests/rt/2003-fall/index.html; 2003.

Quinlan, J. Ross; C4.5: Programs for Machine Learning; Morgan Kaufmann: San Mateo, CA; 1992.

International Search Report; PCT/US2012/029753; Jun. 2012.

Written Opinion of the International Searching Authority; PCT/US2012/029753; Jun. 2012.

* cited by examiner

COMPUTER-IMPLEMENTED SYSTEMS AND METHODS FOR EVALUATING PROSODIC FEATURES OF SPEECH

CROSS-REFERENCE TO RELATED APPLICATIONS

This application claims the benefit of U.S. Provisional Patent Application No. 61/467,498 filed on Mar. 25, 2011, the entire contents of which are incorporated herein by reference.

TECHNICAL FIELD

This document relates generally to speech analysis and more particularly to evaluating prosodic features of low entropy speech.

BACKGROUND

When assessing the proficiency of speakers in reading passages of connected text (e.g., analyzing the speaking ability of a non-native speaker to read aloud scripted (low entropy) text), certain dimensions of the speech are traditionally analyzed. For example, proficiency assessments often measure the reading accuracy of the speaker by considering reading errors on the word level, such as insertions, deletions, or substitutions of words compared to the reference text or script. Other assessments may measure the fluency of the speaker, determining whether the passage is well paced in terms of speaking rate and distribution of pauses and free of disfluencies such as fillers or repetitions. Still other assessments may analyze the pronunciation of the speaker by determining whether the spoken words are pronounced correctly on a segmental level, such as on an individual phone level.

While analyzing these dimensions of speech provides some data for assessing a speaker's ability, these dimensions are unable to provide a complete and accurate appraisal of the speaker's discourse capability.

SUMMARY

In accordance with the teachings herein, systems and methods are provided for scoring speech. A speech sample is received, where the speech sample is associated with a script. The speech sample is aligned with the script. An event recognition metric of the speech sample is extracted, and locations of prosodic events are detected in the speech sample based on the event recognition metric. The locations of the detected prosodic events are compared with locations of model prosodic events, where the locations of model prosodic events identify expected locations of prosodic events of a fluent, native speaker speaking the script. A prosodic event metric is calculated based on the comparison, and the speech sample is scored using a scoring model based upon the prosodic event metric.

As another example, a system for scoring speech may include a processing system and one or more memories encoded with instructions for commanding the processing system to execute a method. In the method, a speech sample is received, where the speech sample is associated with a script. The speech sample is aligned with the script. An event recognition metric of the speech sample is extracted, and locations of prosodic events are detected in the speech sample based on the event recognition metric. The locations of the detected prosodic events are compared with locations of model prosodic events, where the locations of model prosodic events identify expected locations of prosodic events of a fluent, native speaker speaking the script. A prosodic event metric is calculated based on the comparison, and the speech sample is scored using a scoring model based upon the prosodic event metric.

As a further example, a non-transitory computer-readable medium may be encoded with instructions for commanding a processing system to execute a method. In the method, a speech sample is received, where the speech sample is associated with a script. The speech sample is aligned with the script. An event recognition metric of the speech sample is extracted, and locations of prosodic events are detected in the speech sample based on the event recognition metric. The locations of the detected prosodic events are compared with locations of model prosodic events, where the locations of model prosodic events identify expected locations of prosodic events of a fluent, native speaker speaking the script. A prosodic event metric is calculated based on the comparison, and the speech sample is scored using a scoring model based upon the prosodic event metric.

DETAILED DESCRIPTION

Figure 1:
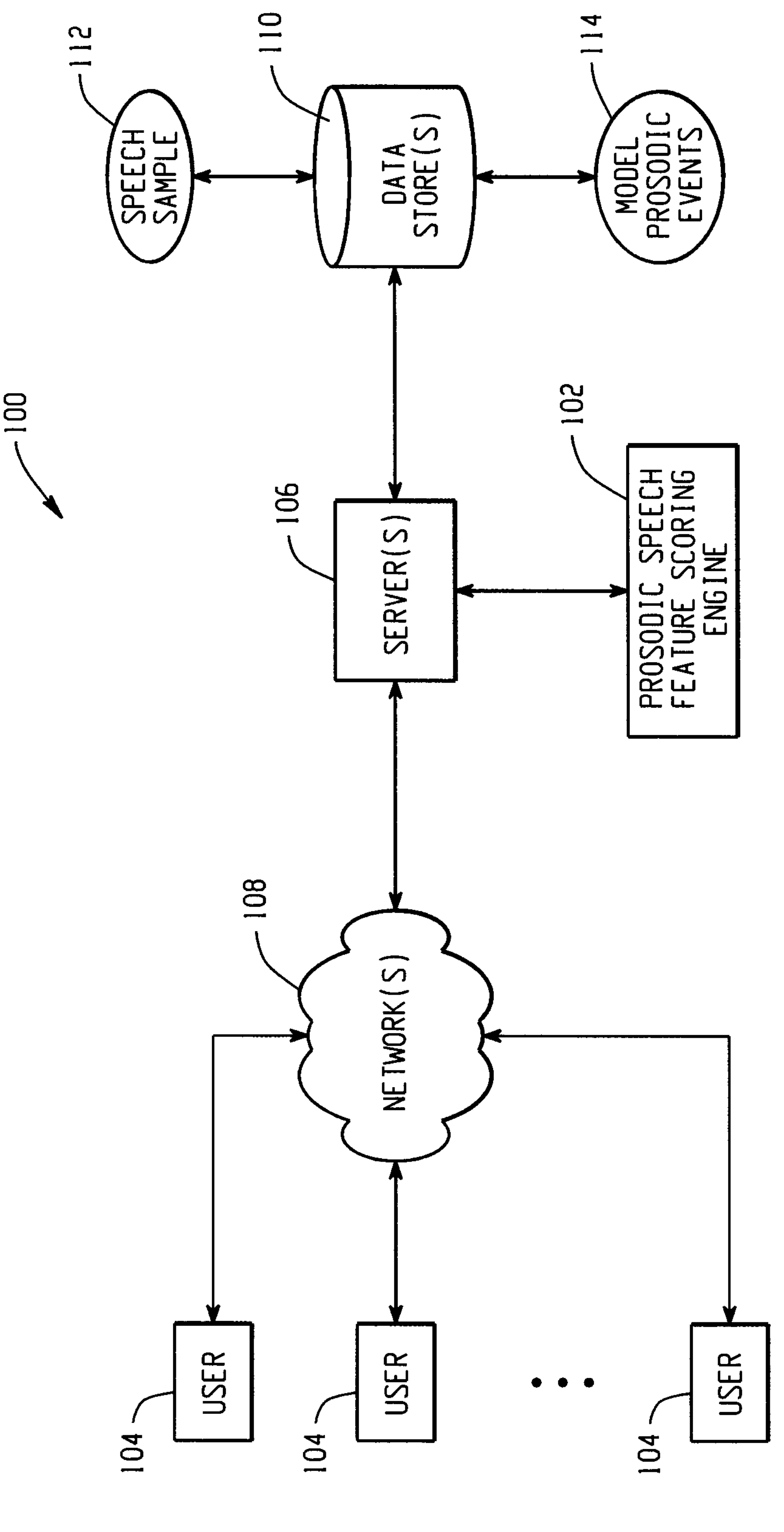
FIG. 1 is a block diagram depicting a computer-implemented prosodic speech feature scoring engine.

FIG. 1 is a block diagram depicting a computer-implemented prosodic speech feature scoring engine. A computer processing system implementing a prosodic speech feature scoring engine 102 (e.g., via any suitable combination of hardware, software, firmware, etc.) facilitates the scoring of speech using prosodic features in a manner that has not previously been used in determining the quality of speech samples. Prosody relates to the rhythm, stress, and intonation of speech, such as patterns of stressed syllables and intonatinal phrases. Examination of the prosody of a speech sample involves examining the rhythm, the distribution of stressed and unstressed syllables, and the pitch contours of phrases and clauses. Results of that examination can be compared to determine whether and how closely they match those of a fluent, native speaker.

The prosodic speech feature scoring engine 102 examines the prosody of a received speech sample to generate a prosodic event metric that indicates the quality of prosody of the speech sample. The speech sample may take a variety of forms. For example, the speech sample may be a sample of a speaker that is speaking text from a script. The script may be provided to the speaker in written form, or the speaker may be instructed to repeat words, phrases, or sentences that are spoken to the speaker by another party. Such speech that largely conforms to a script may be referred to as low entropy speech, where the content of the low entropy speech sample is largely known prior to any scoring based on the association of the low entropy speech sample with the script.

The prosodic speech feature scoring engine 102 may be used to score the prosody of a variety of different speakers. For example, the prosodic speech feature scoring engine 102 may be used to examine the prosody of a non-native (e.g., non-English) speaker's reading of a script that includes English words. As another example, the prosodic speech feature scoring engine 102 may be used to score the prosody of a child or adolescent speaker (e.g., a speaker under 19 years of age), such as in a speech therapy class, to help diagnose shortcomings in a speaker's ability. As another example, the prosodic speech feature scoring engine 102 may be used with fluent speakers for speech fine tuning activities (e.g., improving the speaking ability of a political candidate or other orator).

The prosodic speech feature scoring engine 102 provides a platform for users 104 to analyze the prosodic ability displayed in a speech sample. A user 104 accesses the prosodic speech feature scoring engine 102, which is hosted via one or more servers 106, via one or more networks 108. The one or more servers 106 communicate with one or more data stores 110. The one or more data stores 110 may contain a variety of data that includes speech samples 112 and model prosodic events 114.

Figure 2:
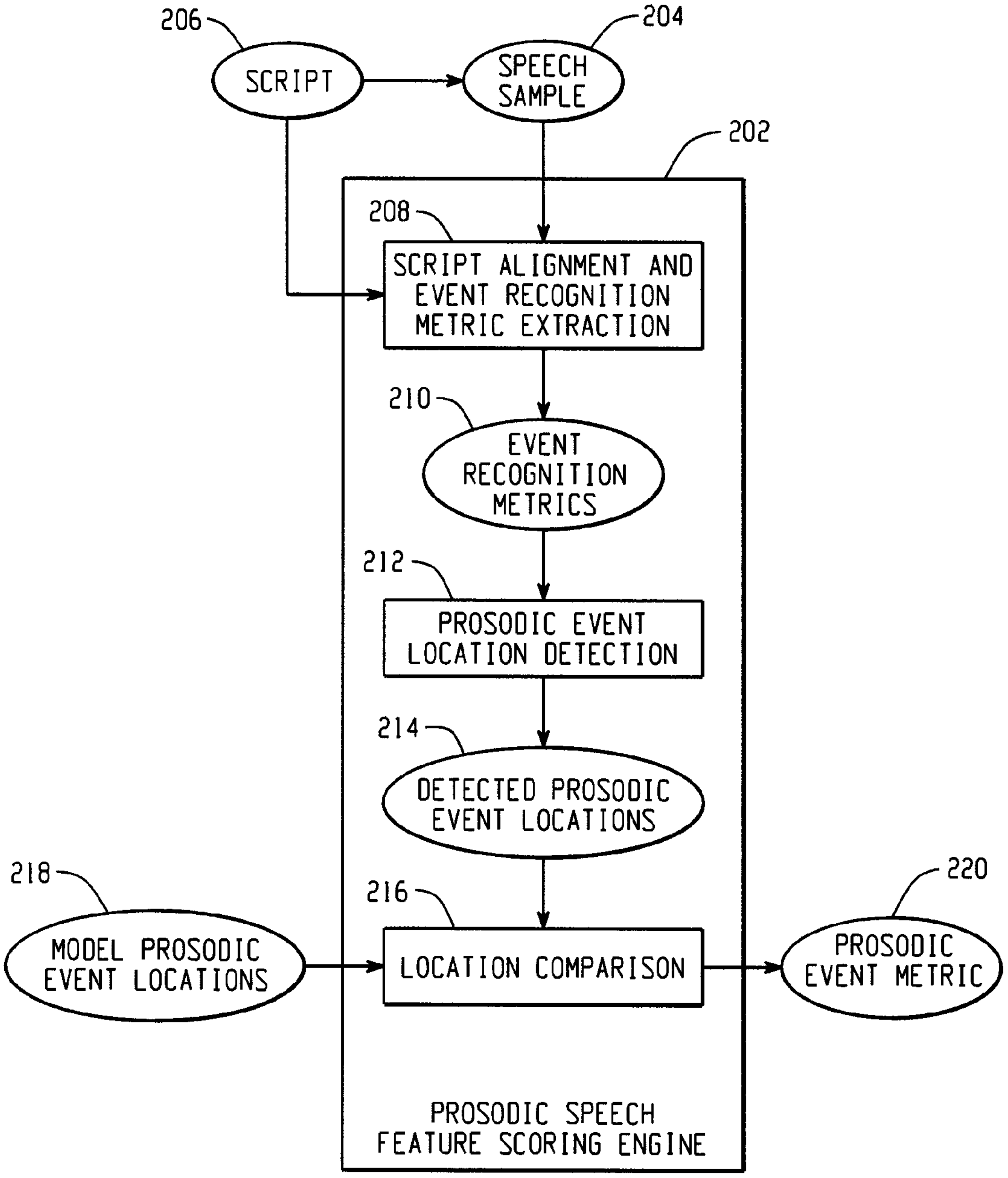
FIG. 2 is a block diagram depicting a computer-implemented system for scoring speech.

FIG. 2 is a block diagram depicting a computer-implemented system for scoring speech. A prosodic speech feature scoring engine 202 receives a speech sample 204. The speech sample 204 is associated with a script 206. For example, the speech sample may be a recording of a speaker reading the words of the script into a microphone. As another example, the speech sample may include a recording of a speaker repeating words, phrases, or sentences voiced aloud to the speaker by a third party. At 208, the speech sample is aligned with the script. For example, the speech sample 204 may be provided to an automatic speech recognizer that also receives the script 206. The automatic speech recognizer aligns time periods of the speech sample 204 with the script 206 (e.g., the automatic speech recognizer determines time stamp intervals of the speech sample 204 that match the different syllables of the words in the script 206). Further at 208, certain event recognition metrics 210 of the speech sample are extracted. Such metrics can include features of the speech sample such as particular power, pitch, and silence characteristics of the speech sample 204 at each syllable of the script. Such features can be extracted using a variety of mechanisms. For example, an automatic speech recognition system used in performing script alignment may output certain event recognition metric values. Additionally, certain variable values used internally by the automatic speech recognition system in performing the alignment can be extracted as event recognition metrics 210.

At 212, locations of prosodic events 214 in the speech sample 204 are detected based on the event recognition metrics 210. For example, the event recognition metrics 210 associated with a particular syllable may be examined to determine whether that syllable includes a prosodic event, such as a stressing or tone change. In another example, additional event recognition metrics 210 associated with syllables near the particular syllable being considered may be used to provide context for detecting the prosodic events. For example, event recognition metrics 210 from surrounding syllables may help in determining whether the tone of the speech sample 204 is rising, falling, or staying the same at the particular syllable.

At 216, a comparison is performed between the locations of the detected prosodic events 214 and locations of model prosodic events 218. The model prosodic events 218 may be generated in a variety of ways. For example, the model prosodic event locations 218 may be generated based on a human annotation of the script based on a fluent, native speaker speaking the script. The comparison at 216 is used to calculate a prosodic event metric 220. The prosodic event metric 220 can represent the magnitude of similarity of the detected prosodic events 214 to the model prosodic events 218. For example, the prosodic event metric may be based on a proportion of matching of syllables having stressed or accented syllables as identified in the detected prosodic event locations 214 and the model prosodic event locations 218. As another example, the prosodic event metric may be based on a proportion of matching of syllables having tone changes as identified in the detected prosodic event locations 214 and the model prosodic event locations 218. If the detected prosodic events 214 of the speech sample 214 are similar to the model prosodic events 218, then the prosody of the speech sample is deemed to be strong, which is represented in the prosodic event metric 220. If there is little matching of the detected prosodic events locations 214 and the model prosodic event locations 218, then the prosodic event metric 220 will identify a low quality of prosody in the speech sample.

The prosodic event metric 220 may be used alone as an indicator of the quality of the speech sample 204 or an indicator of the quality of prosody in the speech sample 204. Further, the prosodic event metric 220 may be provided as an input to a scoring model, where the speech sample is scored using the scoring model based at least in part upon the prosodic event metric.

Figure 3:
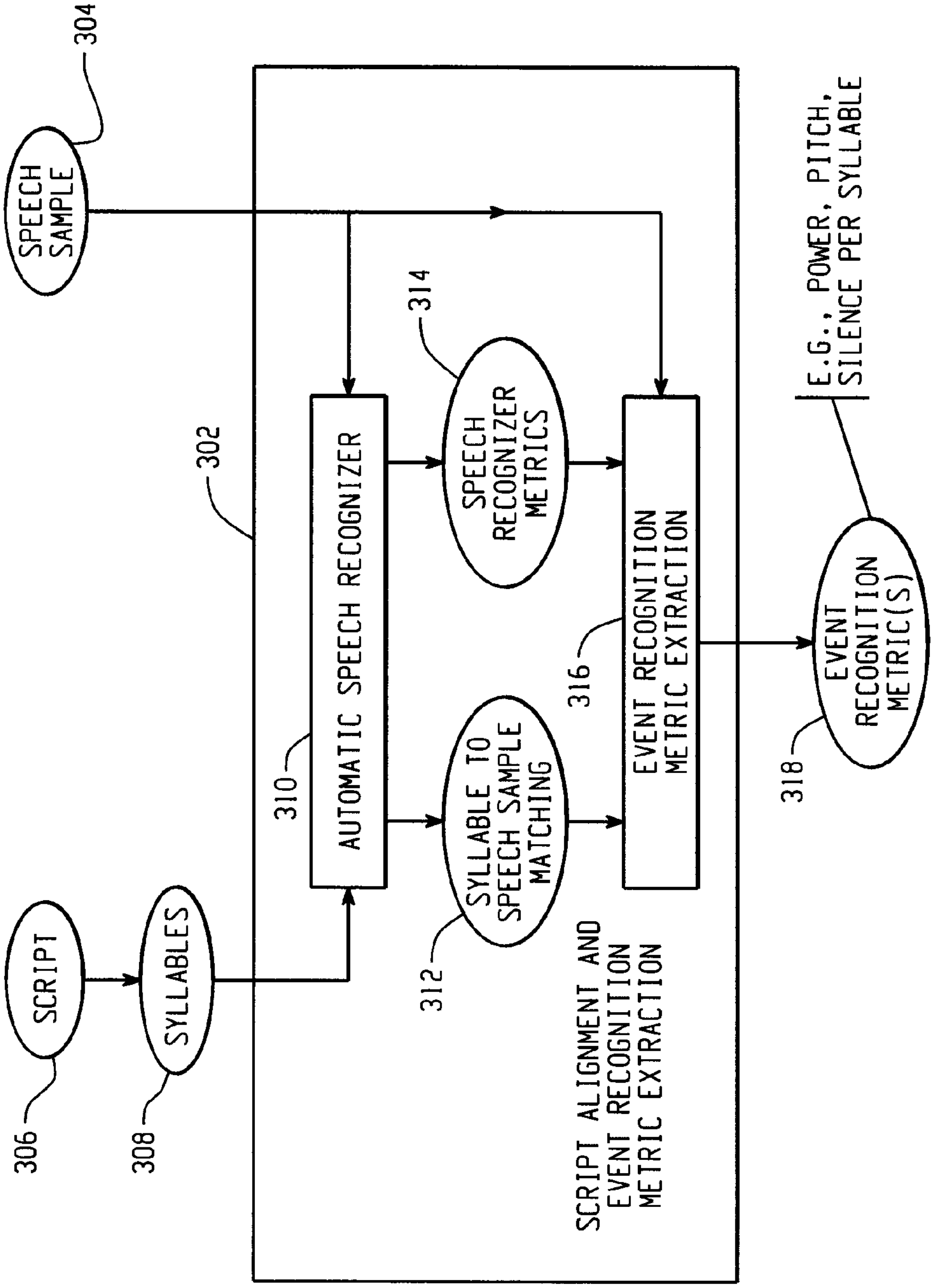
FIG. 3 is a block diagram depicting speech sample-script alignment and extraction of event recognition metrics from the speech sample.

FIG. 3 is a block diagram depicting speech sample-script alignment and extraction of event recognition metrics from the speech sample. The script alignment and event recognition metric extraction 302, receives the speech sample 304 and the script 306 that is made up of a number of syllables 308 that are read aloud by the speaker in generating the speech sample 304. An automatic speech recognizer 310 performs an alignment operation (e.g., via a Viterbi algorithm) to match the syllables 308 with portions of the speech sample. For example, the automatic speech recognizer 310 may match expected syllable nuclei (e.g., vowel sounds, prosodic features) known to be associated with the syllables 308 in the script 306 with vowel sounds detected in the speech sample 304 to generate a syllable to speech sample matching 312 (e.g., an identification of time stamp ranges in the speech sample 304 associated with each syllable). The syllable to speech sample matching 312 can be used to match the syllables of the speech sample 304 to a model speech sample to perform a comparison of prosodic event locations. Alternatively, a model speech sample can be directly matched to the speech sample 304 by the script alignment by performing a time warping of the model speech sample or the speech sample 304 and matching vowel sound locations (e.g., vowel sound locations within a threshold time difference in the two speech samples) between the two speech samples. In one example, the automatic speech recognizer is implemented as a gender-independent continuous-density Hidden Markov Model speech recognizer trained on non-native spontaneous speech.

Outputs from the automatic speech recognizer, such as the syllable to speech sample matching and speech recognizer metrics 314 (e.g., outputs of the automatic speech recognizer 310 and internal variables used by the automatic speech recognizer 310), and the speech sample 304 are used to perform event recognition metric extraction at 316. For example, the event recognition metric extraction can extract attributes of the speech sample 304 at the syllable level to generate the event recognition metrics 318. Example event recognition metrics 318 can include a power measurement for each syllable, a pitch metric for each syllable, a silence measurement metric for each syllable, a syllable duration metric for each syllable, a word-identity associated with a syllable, a dictionary stress associated with the syllable (e.g., whether a dictionary notes that a syllable is expected to be stressed), a distance from a last syllable with a stress or tone metric, as well as others.

Figure 4:
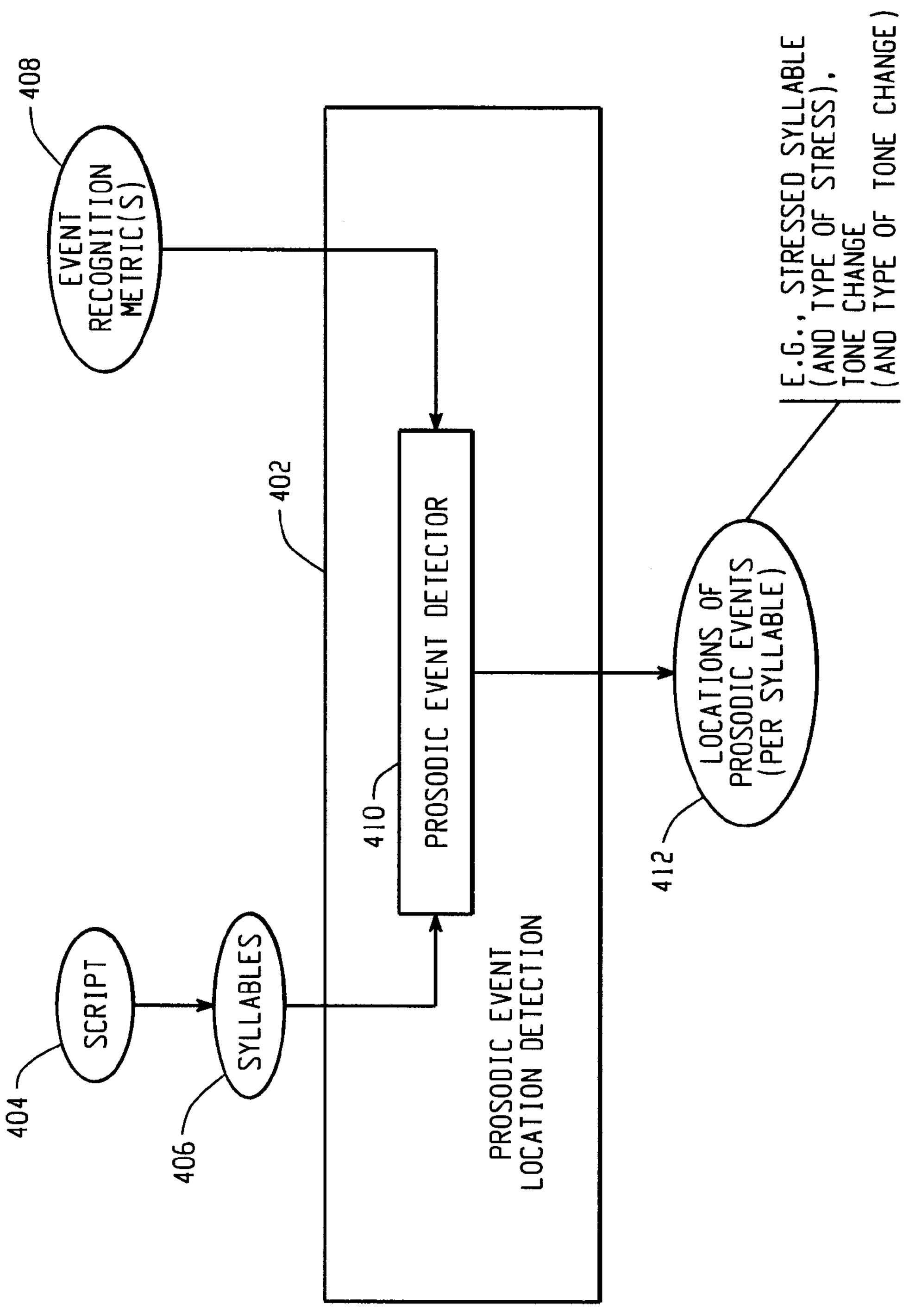
FIG. 4 is a block diagram depicting detection of locations of prosodic events in a speech sample.

FIG. 4 is a block diagram depicting detection of locations of prosodic events in a speech sample. The prosodic event location detection 402 receives a script 404 associated with a speech sample, where the script comprises a plurality of syllables 406. The prosodic event location detection 402 further receives event recognition metrics 408 associated with the speech sample. A prosodic event detector 410 determines locations of prosodic events 412, such as on a per syllable basis. For example, the prosodic event detector 410 may identify, for each syllable, whether the syllable is stressed and whether the syllable includes a tone change. The prosodic event detector 410 may further identify prosodic events at a higher degree of granularity. For example, for a particular syllable, the prosodic event detector 410 may determine whether the particular syllable exhibits a strong stress, a weak stress, or no stress. Further, for the particular syllable, the prosodic event detector 410 may determine whether the particular syllable exhibits a rising tone change, a falling tone change, or no tone change.

The prosodic event detector 410 may be implemented in a variety of ways. In one example, the prosodic event detector 410 comprises a decision tree classifier model that identifies locations of prosodic events 412 based on event recognition metrics 408. In one example, a decision tree classifier model is trained using a number of human-transcribed non-native spoken responses. Each of the responses is annotated for stress and tone labels for each syllable by a native speaker of English. A forced aligned process (e.g., via an automatic speech recognizer) is used to obtain word and phoneme time stamps. The words and phones are annotated to note tone changes (e.g., high to low, low to high, high to high, low to low, and no change), where those tone change annotations describe the relative pitch difference between the last syllable of an intonational phrase and the preceding syllable (e.g., a yes-no question usually ends in a low-to-high boundary tone). Tone changes may also be measured within a single syllable. The words and phones are similarly annotated to identify stressed and not stressed syllables, where stressed syllables were defined as bearing the most emphasis or weight within a clause or sentence. Correlations between the annotations and acoustic characteristics of the syllables (e.g., event recognition metrics) are then determined to generate the decision tree classifier model.

Figure 5:
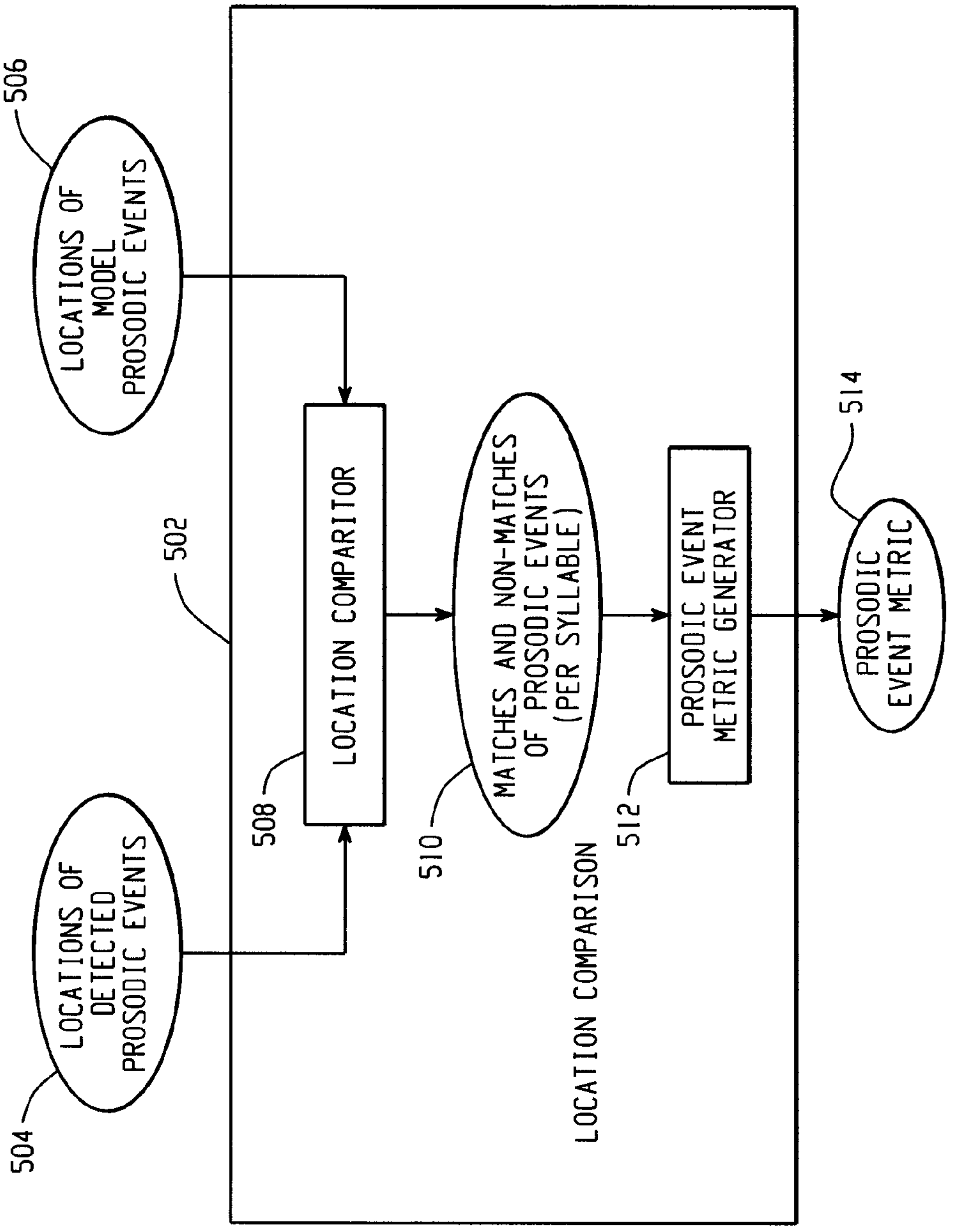
FIG. 5 is a block diagram depicting a comparison between detected prosodic events with model prosodic events.

FIG. 5 is a block diagram depicting a comparison between detected prosodic events with model prosodic events. The location comparison 502 receives locations of detected prosodic events 504 and locations of model prosodic events 506. The locations of model prosodic events 506 can be generated in a variety of ways. For example, the locations of model prosodic events 506 can be generated based on a fluent, native speaker speaking the text of the same script as is associated with speech samples to be scored. In one example, one or more human experts listen to the fluent, native speaker's model speech sample and annotate the syllables of the script to note prosodic events. These annotations can be stored in a data structure that associates the noted prosodic events with their associated syllables. Table 1 depicts an example Model Prosodic Event Data Structure, where data records note whether particular syllables are stressed or include a tone change.

TABLE 1

| Model Prosodic Event Data Structure | | |
|---|---|---|
| Syllable | Stressed | Tone Change |
| 1 | 0 | 0 |
| 2 | 0 | 1 |
| 3 | 1 | 0 |
| 4 | 0 | 0 |
| 5 | 1 | 1 |

In another example, annotations of the model speech sample can be determined via a crowd sourcing operation, where large numbers of people (e.g., >25) who may not be expert linguists, note their impressions of stresses and tone changes per syllable, where the collective opinions of the group are used to generate the Model Prosodic Event Data Structure. In a further example, the Model Prosodic Event Data Structure may be automatically generated by aligning the model speech sample with the script, extracting features of the sample, and identifying locations of prosodic events in the speech sample based on the extracted figures.

Table 2 depicts an example Detected Prosodic Event Data Structure. At 508,

TABLE 2

| Detected Prosodic Event Data Structure | | |
|---|---|---|
| Syllable | Stressed | Tone Change |
| 1 | 0 | 0 |
| 2 | 1 | 1 |
| 3 | 0 | 0 |
| 4 | 0 | 0 |
| 5 | 1 | 1 |

a location comparator compares the locations of detected prosodic events 504 with the locations of the model prosodic events 506 to generate matches and non-matches of prosodic events 510, such as on a per syllable basis. Comparing the data contained in the data structures of Tables 1 and 2, the location comparator determines that the detected prosodic events match in the "Stressed" category 60% of the time (i.e., for 3 out of 5 records) and in the "Tone Change" category 100% of the time. At 512, a prosodic event metric generator determines a prosodic event metric 514 based on the determined matches and non-matches of prosodic events 510. Such a generation at 512 may be performed using a weighted average of the matches and non-matches data 510 or other mechanism (e.g., a precision recall, an F-score (e.g., an $F_1$ score) of the location of detected prosodic events 504 compared to the model prosodic events 506) to provide the prosodic event metric 514 that can be indicative of the prosodic quality of the speech sample.

Figure 6:
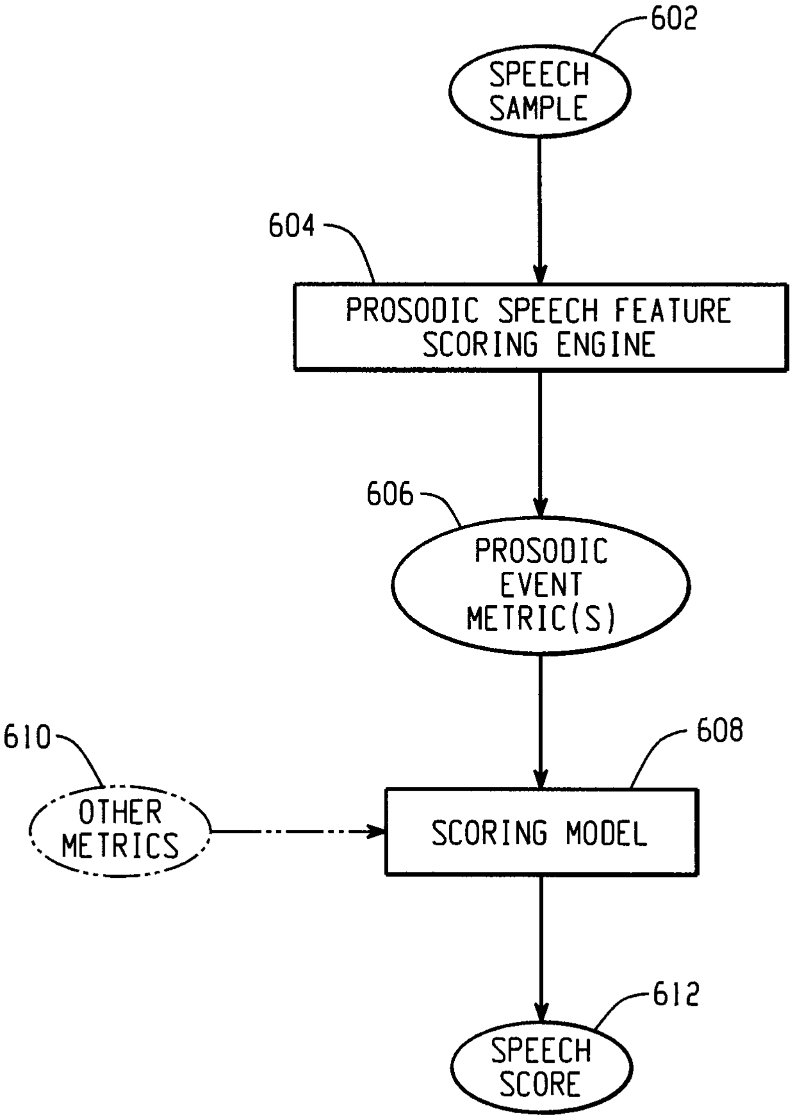
FIG. 6 is a block diagram depicting scoring of a speech sample that considers a prosodic event metric.

The prosodic event metric 514 may be an output in itself, indicating the prosodic quality of a speech sample. Further, the prosodic event metric 514 may be an input to a further data model for scoring an overall quality of the speech sample. FIG. 6 is a block diagram depicting scoring of a speech sample that considers a prosodic event metric. A speech sample 602 is provided to a prosodic speech feature scoring engine 604 to generate one or more prosodic event metrics 606. The one or more calculated prosodic event metrics 606 is provided to a scoring model 608 along with other metrics 610 to generate a speech score 612 for the speech sample 602. For example, the scoring model 608 may base the speech score 612 on the one or more prosodic event metrics 606 as well as one or more of a reading accuracy metric, a fluency metric, and a pronunciation metric, as well as other metrics. For example, the speech score may be calculated by calculating a raw score of the percentage of any of, or a combination of, events spoken correctly for the aforementioned metrics, and the raw score can then be optionally scaled if desired, based on any suitable thresholds to scale the raw score to provide the speech score.

Figure 7:
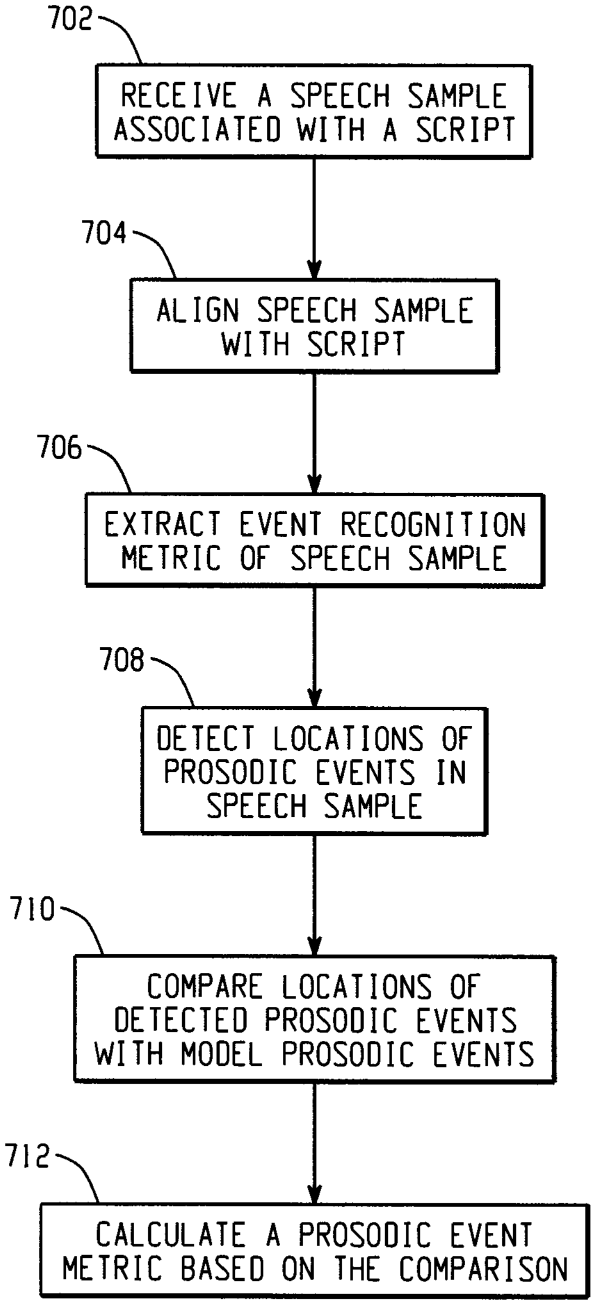
FIG. 7 is a flow diagram depicting a computer-implemented method of scoring speech.

FIG. 7 is a flow diagram depicting a computer-implemented method of scoring speech. A speech sample is received at 702, where the speech sample is associated with a script. The speech sample is aligned with the script at 704. An event recognition metric of the speech sample is extracted at 706, and locations of prosodic events are detected in the speech sample based on the event recognition metric at 708. The locations of the detected prosodic events are compared with locations of model prosodic events at 710, where the locations of model prosodic events identify expected locations of prosodic events of a fluent, native speaker speaking the script. A prosodic event metric is calculated at 712 based on the comparison.

Examples have been used to describe the contents of this disclosure. The scope of this disclosure encompasses examples that are not explicitly described herein. For example, in one such example, alignment between a script and a speech sample is performed on a word by word basis, in contrast to examples where such operations were performed on a syllable by syllable basis.

Figure 8A:
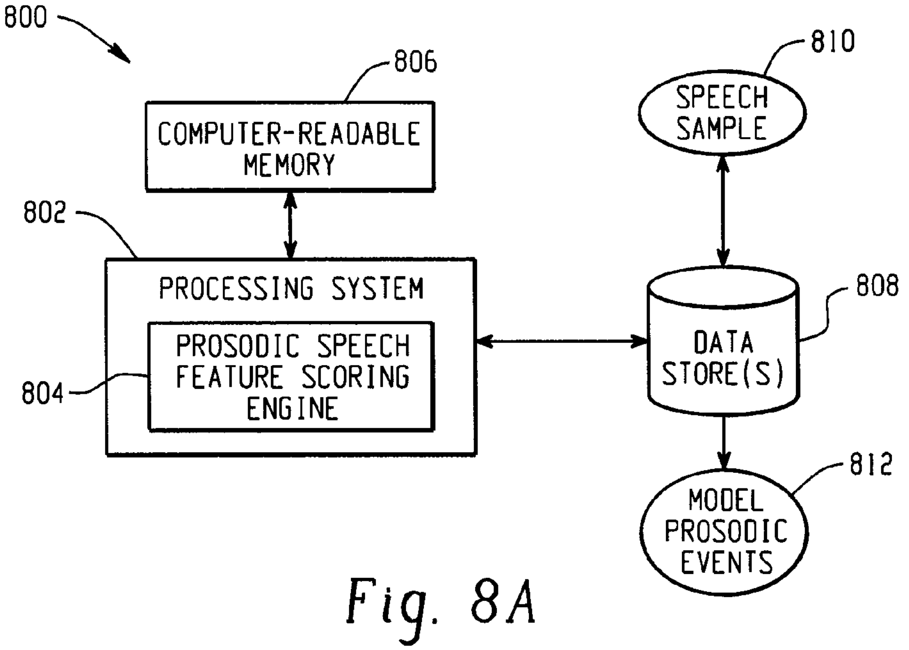
FIGS. 8A, 8B, and 8C depict example systems for use in implementing a prosodic speech feature scoring engine.
Figure 8B:
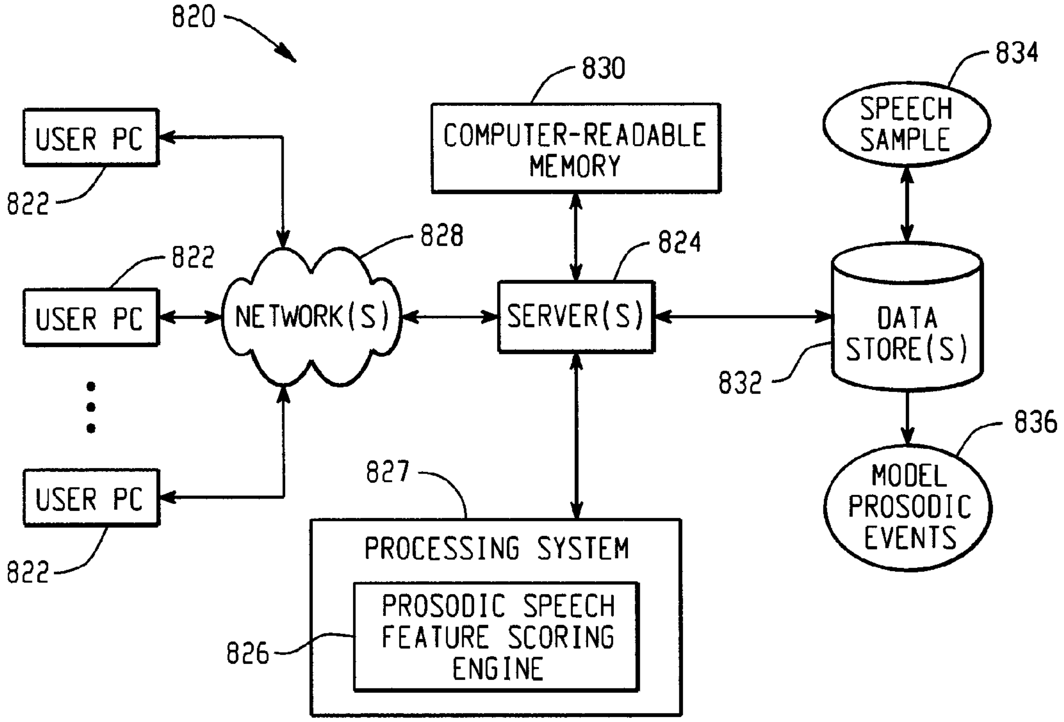
Figure 8C:
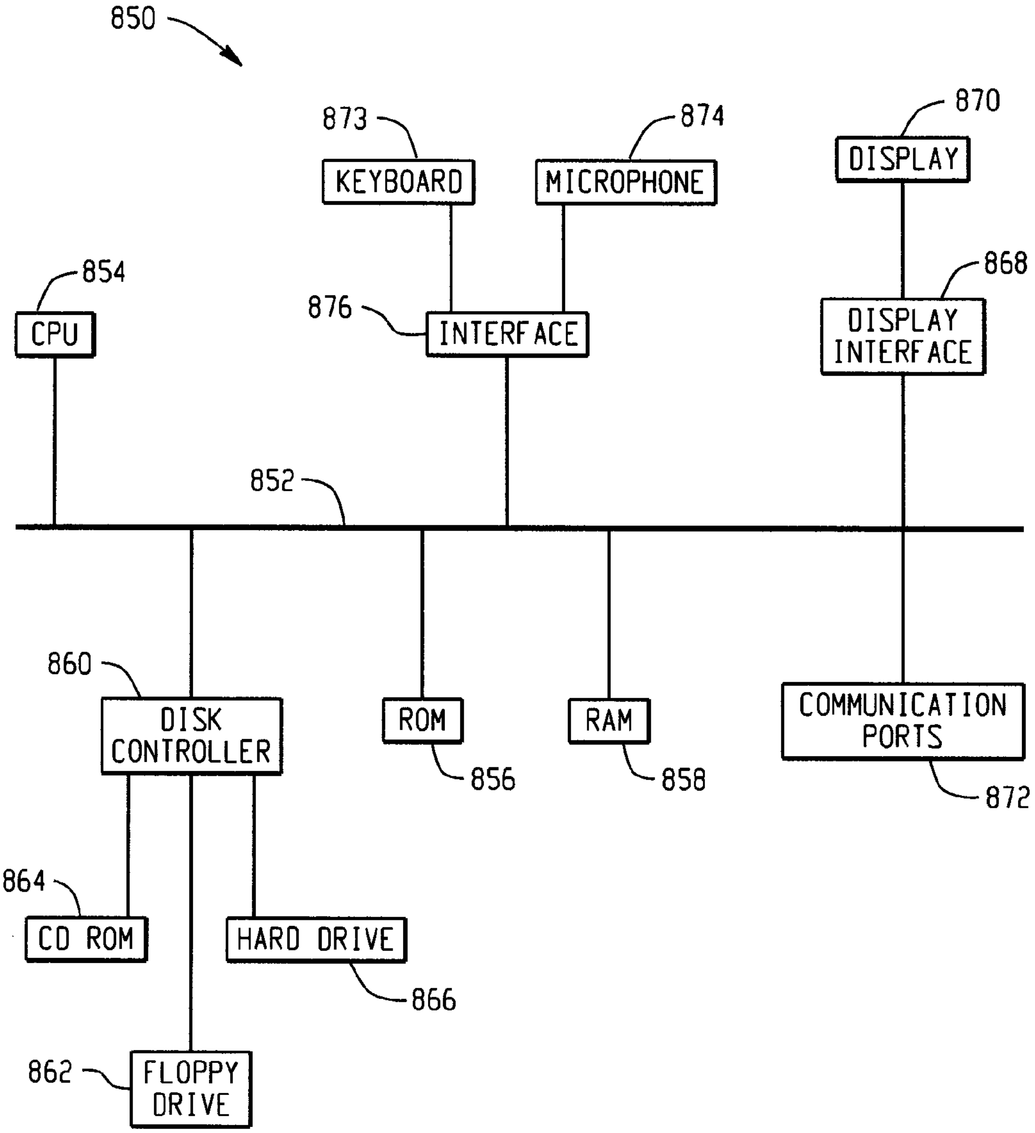

As another example, FIGS. 8A, 8B, and 8C depict example systems for use in implementing a prosodic speech feature scoring engine. For example, FIG. 8A depicts an exemplary system 800 that includes a standalone computer architecture where a processing system 802 (e.g., one or more computer processors located in a given computer or in multiple computers that may be separate and distinct from one another) includes a prosodic speech feature scoring engine 804 being executed on it. The processing system 802 has access to a computer-readable memory 806 in addition to one or more data stores 808. The one or more data stores 808 may include speech sample data 810 as well as model prosodic event data 812.

FIG. 8B depicts a system 820 that includes a client server architecture. One or more user PCs 822 access one or more servers 824 running a prosodic speech feature scoring engine 826 on a processing system 827 via one or more networks 828. The one or more servers 824 may access a computer readable memory 830 as well as one or more data stores 832. The one or more data stores 832 may contain speech sample data 834 as well as model prosodic event data 836.

FIG. 8C shows a block diagram of exemplary hardware for a standalone computer architecture 850, such as the architecture depicted in FIG. 8A that may be used to contain and/or implement the program instructions of system embodiments of the present invention. A bus 852 may serve as the information highway interconnecting the other illustrated components of the hardware. A processing system 854 labeled CPU (central processing unit) (e.g., one or more computer processors at a given computer or at multiple computers), may perform calculations and logic operations required to execute a program. A non-transitory processor-readable storage medium, such as read only memory (ROM) 856 and random access memory (RAM) 858, may be in communication with the processing system 854 and may contain one or more programming instructions for performing the method of implementing a prosodic speech feature scoring engine. Optionally, program instructions may be stored on a non-transitory computer readable storage medium such as a magnetic disk, optical disk, recordable memory device, flash memory, or other physical storage medium.

A disk controller 860 interfaces one or more optional disk drives to the system bus 852. These disk drives may be external or internal floppy disk drives such as 862, external or internal CD-ROM, CD-R, CD-RW or DVD drives such as 864, or external or internal hard drives 866. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 860, the ROM 856 and/or the RAM 858. Preferably, the processor 854 may access each component as required.

A display interface 868 may permit information from the bus 852 to be displayed on a display 870 in audio, graphic, or alphanumeric format. Communication with external devices may optionally occur using various communication ports 872.

In addition to the standard computer-type components, the hardware may also include data input devices, such as a keyboard 873, or other input device 874, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method of scoring speech, comprising:

receiving a speech sample, wherein the speech sample is based upon speaking from a script;

aligning, using a processing system, the speech sample with the script;

extracting, using the processing system, an event recognition metric of the speech sample;

detecting, using the processing system, locations of prosodic events in the speech sample based on the event recognition metric;

comparing, using the processing system, the locations of the detected prosodic events with locations of model prosodic events, wherein the locations of model prosodic events identify expected locations of prosodic events of a fluent, native speaker speaking the script, and wherein the comparing comprises comparing a first data structure for the model prosodic events and a second data structure for the detected prosodic events, the first data structure and the second data structure including binary data per syllable representing whether or not a syllable exhibits a stress and whether or not the syllable exhibits a tone change, said comparing including comparing per syllable the binary data representing stress and the binary data representing tone change for the model prosodic events and the detected prosodic events;

calculating, using the processing system, a prosodic event metric based on the comparison; and scoring, using the processing system, the speech sample using a scoring model based upon the prosodic event metric.

2. The method of claim 1, wherein the script is divided according to syllables or words, and wherein the locations of the model prosodic events identify which syllables or words are expected to include a prosodic event.

3. The method of claim 1, wherein the received speech sample is divided into syllables or words and the syllables or words of the speech sample are aligned with the syllables or words from the script.

4. The method of claim 3, wherein said aligning is performed using the Viterbi algorithm.

5. The method of claim 3, wherein said aligning is performed using syllable nuclei that include vowel sounds or prosodic events.

6. The method of claim 3, wherein said aligning is based on a tolerance time window.

7. The method of claim 1, wherein said detecting includes associating the detected prosodic events with syllables or words of the speech sample.

8. The method of claim 1, wherein said comparing includes determining whether a syllable or word of the speech sample having an associated detected prosodic event matches an expected prosodic event for that syllable or word.

9. The method of claim 1, wherein the locations of the model prosodic events are determined based upon a human annotating a reference speech sample produced by a native speaker speaking the script; or wherein the locations of the model prosodic events are determined based upon crowd sourced annotations of a reference speech sample or automated prosodic event location determination of the reference speech sample.

10. The method of claim 1, wherein the speech sample is a sample of the script being read aloud by a non-native speaker or a person under the age of 19.

11. The method of claim 1, wherein event recognition metrics include measurements of power, pitch, silences in the speech sample, or dictionary stressing information of words recognized by an automated speech recognition system.

12. The method of claim 1, wherein the prosodic events include a stressing of a syllable or word.

13. The method of claim 12, wherein the stressing of the syllable or word is detected as being a strong stressing, a weak stressing, or no stressing; or wherein the stressing of the syllable or word is detected as being present or not present.

14. The method of claim 1, wherein the prosodic events include a tone change from a first syllable to a second syllable, within a syllable, from a first word to a second word, or within a word.

15. The method of claim 14, wherein the tone change is detected as being a rising change, a falling change, or no change; or wherein the tone change is detected as existing or not existing.

16. The method of claim 1, wherein speech classification is used to detect the locations of the prosodic events in the speech sample.

17. The method of claim 16, wherein the speech classification is carried out using a decision tree trained on speech samples manually annotated for prosodic events.

18. The method of claim 1, wherein a prosodic event is a silence event.

19. The method of claim 1, wherein said aligning includes applying a warping factor to the speech sample to match a reading time associated with the script read by a fluent, native speaker.

20. The method of claim 1, wherein the event recognition metric comprises one or more of a precision, recall, and F-score of automatically predicted prosodic events in the speech sample compared to the model prosodic events.

21. The method of claim 1, wherein the speech sample is a low entropy speech sample that is elicited from a speaker using a written or oral stimulus presented to the speaker.

22. A system for scoring speech, comprising:

a processing system; and a memory wherein the processing system is configured to perform operations including:

receiving a speech sample, wherein the speech sample is based upon speaking from a script;

aligning the speech sample with the script;

extracting an event recognition metric of the speech sample;

detecting locations of prosodic events in the speech sample based on the event recognition metric;

comparing the locations of the detected prosodic events with locations of model prosodic events, wherein the locations of model prosodic events identify expected locations of prosodic events of a fluent, native speaker speaking the script, and wherein the comparing comprises comparing a first data structure for the model prosodic events and a second data structure for the detected prosodic events, the first data structure and the second data structure including binary data per syllable representing whether or not a syllable exhibits a stress and whether or not the syllable exhibits a tone change, said comparing including comparing per syllable the binary data representing stress and the binary data representing tone change for the model prosodic events and the detected prosodic events;

calculating a prosodic event metric based on the comparison; and scoring the speech sample using a scoring model based upon the prosodic event metric.

23. The system of claim 22, wherein the received speech sample is divided into syllables or words and the syllables or words of the speech sample are aligned with the syllables or words from the script.

24. The system of claim 22, wherein said comparing includes determining whether a syllable or word of the speech sample having an associated detected prosodic event matches an expected prosodic event for that syllable or word.

25. The system of claim 22, wherein event recognition metrics include measurements of power, pitch, silences in the speech sample, or dictionary stressing information of words recognized by an automated speech recognition system.

26. The system of claim 22, wherein speech classification is used to detect the locations of the prosodic events in the speech sample.

27. The system of claim 22, wherein said aligning includes applying a warping factor to the speech sample to match a reading time associated with the script read by a fluent, native speaker.

28. The system of claim 22, wherein the event recognition metric comprises one or more of a precision, recall, and F-score of automatically predicted prosodic events in the speech sample compared to the model prosodic events.

29. A non-transitory computer readable storage medium, including instructions configured to cause a processing system to execute steps for scoring speech, comprising:

receiving a speech sample, wherein the speech sample is based upon speaking from a script;

aligning the speech sample with the script;

extracting an event recognition metric of the speech sample;

detecting locations of prosodic events in the speech sample based on the event recognition metric;

comparing the locations of the detected prosodic events with locations of model prosodic events, wherein the locations of model prosodic events identify expected locations of prosodic events of a fluent, native speaker speaking the script, and wherein the comparing comprises comparing a first data structure for the model prosodic events and a second data structure for the detected prosodic events, the first data structure and the second data structure including binary data per syllable representing whether or not a syllable exhibits a stress and whether or not the syllable exhibits a tone change, said comparing including comparing per syllable the binary data representing stress and the binary data representing tone change for the model prosodic events and the detected prosodic events;

calculating a prosodic event metric based on the comparison; and scoring the speech sample using a scoring model based upon the prosodic event metric.

30. The non-transitory computer readable storage medium claim 29, wherein the received speech sample is divided into syllables or words and the syllables or words of the speech sample are aligned with the syllables or words from the script.

31. The non-transitory computer readable storage medium claim 29, wherein said comparing includes determining whether a syllable or word of the speech sample having an associated detected prosodic event matches an expected prosodic event for that syllable or word.

32. The non-transitory computer readable storage medium claim 29, wherein event recognition metrics include measurements of power, pitch, silences in the speech sample, or dictionary stressing information of words recognized by an automated speech recognition system.

33. The non-transitory computer readable storage medium claim 29, wherein speech classification is used to detect the locations of the prosodic events in the speech sample.

34. The non-transitory computer readable storage medium claim 29, wherein said aligning includes applying a warping factor to the speech sample to match a reading time associated with the script read by a fluent, native speaker.

35. The non-transitory computer readable storage medium claim 29, wherein the event recognition metric comprises one or more of a precision, recall, and F-score of automatically predicted prosodic events in the speech sample compared to the model prosodic events.

* * * * *